United States Patent
Karnik

(10) Patent No.: US 9,100,418 B2
(45) Date of Patent: Aug. 4, 2015

(54) ADAPTIVE DATA VERIFICATION FOR RESOURCE-CONSTRAINED SYSTEMS

(75) Inventor: Aditya R Karnik, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 2039 days.

(21) Appl. No.: 12/195,737

(22) Filed: Aug. 21, 2008

(65) Prior Publication Data

US 2010/0049976 A1   Feb. 25, 2010

(51) Int. Cl.
- *H04L 9/00* (2006.01)
- *H04L 29/06* (2006.01)
- *H04L 29/08* (2006.01)

(52) U.S. Cl.
CPC ............... *H04L 63/12* (2013.01); *H04L 67/12* (2013.01); *H04L 63/105* (2013.01)

(58) Field of Classification Search
CPC ........ H04L 63/12; H04L 63/105; H04L 67/12
USPC .......... 713/161, 168, 169, 176, 170; 380/229, 380/258; 726/2, 4, 5
See application file for complete search history.

(56) References Cited

U.S. PATENT DOCUMENTS

| | | | | |
|---|---|---|---|---|
| 7,191,355 | B1 * | 3/2007 | Ouellette et al. | 713/400 |
| 7,739,402 | B2 * | 6/2010 | Roese et al. | 709/242 |
| 2003/0055894 | A1 * | 3/2003 | Yeager et al. | 709/204 |
| 2004/0111369 | A1 * | 6/2004 | Lane et al. | 705/40 |
| 2004/0268381 | A1 * | 12/2004 | Simelius et al. | 725/19 |
| 2007/0076733 | A1 * | 4/2007 | Bosseler | 370/412 |
| 2008/0278314 | A1 * | 11/2008 | Miller et al. | 340/539.13 |
| 2009/0142055 | A1 * | 6/2009 | Qiu et al. | 398/45 |

FOREIGN PATENT DOCUMENTS

CN   101159970 A   4/2008

* cited by examiner

*Primary Examiner* — Saleh Najjar
*Assistant Examiner* — Peiliang Pan
(74) *Attorney, Agent, or Firm* — John A. Miller; Miller IP Group, PLC

(57) ABSTRACT

A system and method for adaptively verifying data in resource constrain systems. The adaptive data verification mechanism employs the proper mode of verification adaptively to balance cost/performance requirements plus security requirements. The algorithm uses a belief level for the validity of a received message, and assigns the belief level to a scale between a bona fide message at one end of the scale and a malicious message at an opposite end of the scale. Depending where on the scale the belief level falls determines which validation mode will be used to authenticate the message. In an alternate embodiment, the belief level relative to a scale and the amount of data waiting to be processed in a buffer are both used to determine which mode will be used to validate the message.

10 Claims, 2 Drawing Sheets

ADAPTIVE DATA VERIFICATION FOR RESOURCE-CONSTRAINED SYSTEMS

BACKGROUND OF THE INVENTION

1. Field of the Invention

This invention relates generally to a system and method providing an adaptive verification algorithm for resource constrained systems and, more particularly, to a system and method providing an adaptive verification algorithm for resource constrained systems that employ modes of verification based on a belief of message validity so as to balance cost/performance requirements with security requirements of the system.

2. Description of the Related Art

Authentication, the process of establishing something or someone as genuine or bona fide, is an integral part of any security system. In the context of information security, it is the data and its users that require authentication. Data authentication, or verification, mechanisms have been studied extensively in the past few decades, and as a result, a multitude of mechanisms now exist.

Cryptography forms the backbone of the majority of the authentication mechanisms. Perhaps the most well known cryptographic technique is asymmetric key cryptography. Each principal using this mechanism has a pair of keys, namely a private key and a public key. The private key is known only to the principal, whereas the public key can be shared with other entities in the system. To ensure message integrity, the sender of a message signs the message with his private key, and adds his signature to the message. Upon receiving the message, the recipient can verify the signature of the message using the sender's public key.

The public key infrastructure (PKI) system is based on asymmetric key cryptography. In a PKI system, the bona fide users of the system are issued certificates, i.e., documents confirming their public key, by a certifying authority. When communicating information, users sign their message content with their private key and attach this signature to the message along with their certificate. The receiver can establish the legitimacy of the sender by verifying the certificate and authenticity or integrity of the message content by verifying its signature.

In some cases, data can also be authenticated using context specific knowledge or consistency checks, for example, a real time kinetic (RTK) computation of raw GPS data can be used to authenticate location information and vehicle trajectory information, can be authenticated using physics-based models.

Authentication mechanisms come at a cost. Cryptographic operations are, in general, computationally intensive. Even some consistency checks may be computationally as demanding as cryptographic operations, if not more. In areas where information security is paramount, these are usually secondary concerns. This has been the case with the traditional application domain, such as banking and financial transactions. Newer application domains, such as industrial automation, wireless vehicular and sensor networks, on the other hand, are driven by performance and cost constraints. Thus, a cryptographic mechanism that can establish legitimacy of data in the face of attacks can render the whole exercise of deploying a sensor network futile since miniature sensors have limited computational power, and typically need to process and communicate data at a certain data rate to be of any utility. Similar constraints hold in vehicular network as well. This is not to say that security, or authentication in particular, is of secondary importance, but that it cannot be an after-thought for such systems.

There have been two approaches to address this problem. The first approach uses "lightweight" mechanisms to reduce computational and communication overheads. The second approach uses trust-based authentication, which explicitly establishes trust among two parties before their interaction begins. Regardless of the efficiency of a mechanism, the first approach fails to exploit the fact that verification mechanisms can be suited to a particular scenario, where if the sender is known to be bona fide or malicious there is no need for verification. Data can be accepted directly in the former case while discarded in the latter. Moreover, lightweight mechanisms may not provide all desirable security attributes. Trust-based mechanisms, on the other hand, may open up vulnerability if too much reliance is placed on the initial exchange disregarding the possibility of spoofing. These mechanisms are also usually difficult to implement in scenarios where communicating parties change with time, such as in a vehicular network, due to mobility, and/or where communication is not necessarily one-to-one, such as broadcasting in wireless person and vehicular networks.

SUMMARY OF THE INVENTION

In accordance with the teachings of the present invention, a system and method for adaptively verifying data in resource constrain systems are disclosed. The adaptive data verification mechanism employs the proper mode of verification adaptively to balance cost/performance requirements plus security requirements. In one non-limiting embodiment of this mechanism, the algorithm uses a belief level for the sender or for the validity of a received message, and assigns the belief level to a scale between a bona fide message at one end of the scale and a malicious message at an opposite end of the scale. Depending where on the scale the belief level falls, the algorithm appropriately selects the verification mode to authenticate the message. In another non-limiting embodiment, the belief level relative to a scale and the amount of data waiting to be processed in a buffer are both used to determine which mode will be used to validate the message.

Additional features of the present invention will become apparent from the following description and appended claims, taken in conjunction with the accompanying drawings.

DETAILED DESCRIPTION OF THE EMBODIMENTS

Figure 1:
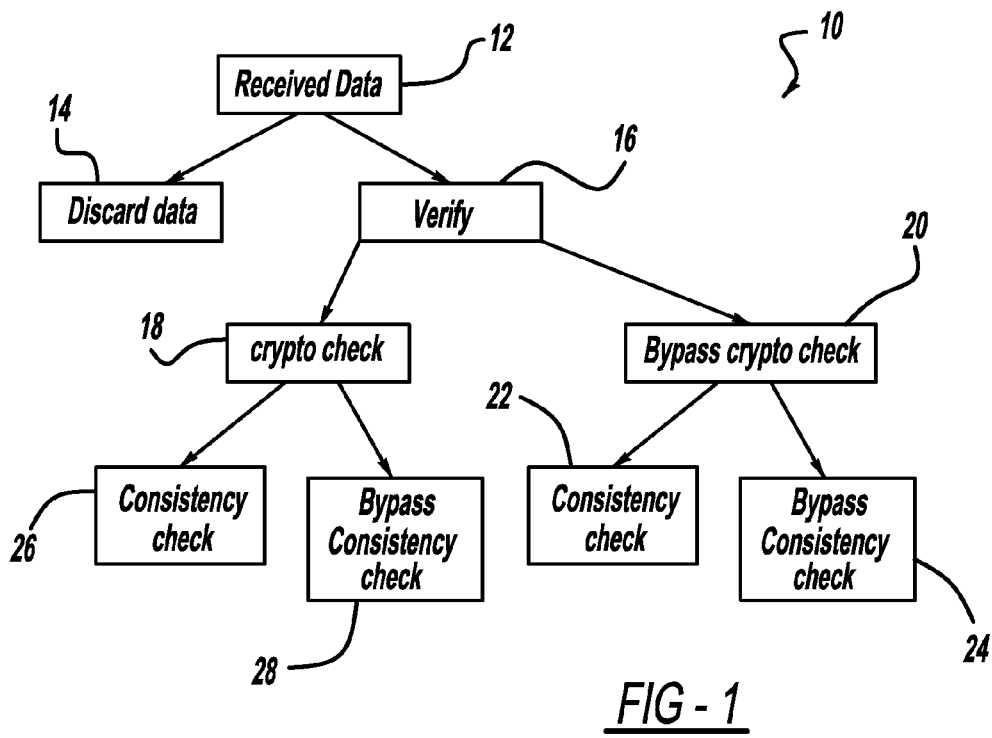
FIG. 1 is a block diagram showing one possible process for selecting a mode of operation in adaptive data verification.

The following discussion of the embodiments of the invention directed to a system and method for providing adaptive verification in a resource constrained system is merely exemplary in nature, and is in no way intended to limit the invention or its applications or uses.

The present invention proposes a novel approach for verifying data on a need-to-verify basis. It introduces the idea of adaptive data verification for a resource-constrained system to efficiently balance security and performance/cost requirements, and provides two implemental adaptive verification algorithms based on this basic idea that can save the cost of sophisticated hardware, such as dedicated chips for fast cryptography operations, fast processors and large power supplies, while meeting the processing and security requirements.

The need for data verification for an entity arises because of uncertainty about the other entities' intent. If the sender is known to be either bona fide or malicious, there is no need to verify. For the purposes herein, a verification mechanism or mode of operation refers to either a stand-alone authentication mechanism of to any combination or authentication mechanisms. Blind accept and discard will also be treated as verification mechanisms. The present invention is not generally concerned about which modes are implemented, but only that there are multiple modes at a receivers disposal. This assumption always holds since blind accept and discard are treated as modes. Note, however, that multiplicity of non-trivial modes in itself is not an inconceivable scenario. Dual signature schemes where the same message is signed by two signatures, one typically being lightweight and the other based on asymmetric keys, and consistency checks based on information obtained locally, such as from sensors mounted on the vehicle, GPS information, physics-based models, etc., are suitable examples. Each verification mode will need certain computational resources, and will lead to delay in processing other received information, thereby, rendering it stale. Typically, the more extensive the mode, the lower is its vulnerability and the lower is the rate at which it can verify messages.

The term resource constrained system refers generally to any system operating under limited resources and having certain performance constraints. Examples of resources are computational power on the communication bandwidth, operating or design cost, etc. Performance constraints could be in terms of desired processing rate, latencies, etc. There could be additional constraints as well. In such systems, naive implementations of security, or authentication mechanism in particular, would negatively impact the cost/performance requirements.

One example of a resource constrained system is vehicular on-board units (OBUs). Typical OBUs could be limited by computation power, and may have to use multi-purpose 400-800 MHz processors with an FPU, where specialized cryptographic processors may not be available. The same processor may also need to handle tasks other than vehicle-to-vehicle (V2V) communications. OBUs also have tight performance constraints. For applications such as cooperative collision warning (CCW) vehicles need to track each other fairly accurately by communicating kinematical information (location, velocity, etc.) with each other. At each vehicle, the received information must be processed promptly since it becomes stale with time. For example, at speeds of 100 kmph, a vehicle moves 2.7 m, roughly half the body length in a second. Moreover, the set of vehicles with which a particular vehicle is in communication changes with time, and vehicles transmit messages to all of the vehicles in the range rather than one at a time.

Although the following discussion uses vehicular networks as an example, it is stressed, however, that the basic ideas and mechanisms proposed herein are applicable to all resource-constraint systems. The following is the basic philosophy of the adaptive data verification process of the invention.

Each mode of operation is characterized by its strength and cost/rate of processing. Qualitatively, the strength of a mode is a measure of its resistance to attacks, i.e., the higher the strength, the lower is the vulnerability. Quantitatively it can be captured by security properties. The present invention requires modes to be compared based on their strengths, hence strength can be defined subjectively as long as consistency is followed in the cryptographic properties, for example, a PKI system with 64 bit key is considered weaker or amenable to break-and-attack than a PKI system with 128 bit keys. It is also reasonable to assume that given two modes of different strengths, the mode with the higher strength requires processing time or cost that is at least as high as the other. A discard mode is assigned arbitrarily high strength and a blind accept mode is assigned an arbitrarily low strength.

Upon receiving messages from other vehicles, the receiver decides which mode to employ for verification. The process of mode selection can be done for one message at a time or for multiple messages, i.e., batches, at a time. For example, if discard, blind accept, crypto check (based on PKI), consistency check and crypto-followed by consistency check are the available modes, the receiver may select a mode for each incoming message or for a batch of messages, where the determination of the batch size is left open to implementation. The mode selection can also be done sequentially as discussed below.

FIG. 1 is a flow chart diagram 10 showing an example of the verification options and modes as being discussed herein. The flow chart diagram 10 shows four modes that the verification system on the vehicle can employ once it receives data at box 12. The verification algorithm can discard the data at box 14 as one mode. In the discard mode, the information is lost, but the processing rate is very high and there is no vulnerability to attack. If the data is not discarded, then it can be verified at box 16. The verification process can include a cryptography check at box 18 or the cryptography check can be by-passed at box 20. The cryptography check essentially performs a digital signature check on the message as discussed above. The algorithm determines whether to do the cryptography check.

If the cryptography check is by-passed at the box 20, then the algorithm can determine whether to do a consistency check at box 22 or by-pass the consistency check at box 24. By-passing the cryptography check and the consistency check at the box 24 means the validation is in a blind accept mode where the processing rate is high and the vulnerability is also high. The consistency check can use any information that is available, such as the GPS location of a vehicle, vehicle speed, etc. If the cryptography check is performed at the box 18, the algorithm then can determine whether a consistency check will be performed at box 26 or whether the consistency check will be by-passed at the box 28. For the consistency check at the box 26, the highest level of verification has been performed where the processing rate is low and the vulnerability is also low. At the box 28 where the cryptography check has been performed, but the consistency check has not been performed and at the box 22 where the cryptography check has not been performed and the consistency check has been performed, a conditional accept has occurred where the processing rate is low to medium and the vulnerability is medium to high. Therefore, the five modes of verification illustrated by the diagram 10 include discarding the data, blind accept of the data by not doing either the cryptography check or the consistency check, conditional accept where the cryptography check and the consistency check are performed and conditionally accepts where one or the other of the cryptography check or the consistency check is performed.

The decision about which verification mode to employ is based on the receivers belief about the "environment", and/or the amount of unprocessed data is has in its buffer. The definition and implementation of "belief" is left open. One possible way of representing belief would be by probability distribution on the maliciousness of the environment. If a message stream can be associated or identified with a particular vehicle, such as from a unique identifier, each vehicle can maintain beliefs about individual vehicles. In such a case, belief is essentially a probability distribution based on {0, 1} where "0" codes a malicious state and "1" codes a bona fide state. If the belief must be maintained about the environment, such as owing to anonymity requirements, it is best to discretize the state space into "degrees" of maliciousness (e.g., {0, 1, 2, 3} with increasing sequence denoting increasing severity of maliciousness). It is also possible to represent a belief by probability distribution on those degrees. It is important to note that belief is not reputation. This means that in case a vehicle can maintain beliefs about individual vehicles, they are not memorized and their validity is lost after the interaction is over (this makes sense given the dynamic nature of the network). If a vehicle can have a belief only about the "vehicular environment", the belief will change over time (owing to changes in the mix of the neighbors).

The aspect of the amount of unprocessed data at the receiver, also referred to as queue-length, comes in because the received data will have to be buffered until verified, thereby, delaying it for application processing. The above decision may be based on the instantaneous or time-average queue-length. Implementation of a verification buffer is left to the implementer. There could be a single verification buffer, where data received from all neighboring vehicles awaits processing, or a per-sender verification buffer or even application class buffers (to process received data according to application classes). Adaptive verification is applicable to any of these buffers by appropriately choosing the belief space.

The belief is updated by observing the outcomes of the verification mechanisms. Some external inputs, such as from an authority, could also be used to update a belief. Decisions regarding the belief update, i.e., whether to update, when to update and how to update, are left to the specific implementation. The belief update strategy can be selected to reflect the caution each receiver wants to exercise. An aggressive strategy may slowly increase the belief, but drastically reduce it if a verification mechanism raises an alert (to appreciate this fact note that a mechanism can give false alerts), thereby, blocking a sender completely. Such a strategy, however, will be vulnerable to spoofing attacks.

The cost and rate of processing and the vulnerability is efficiently balanced. Note that the objective of adaptive verification is not to identify and label malicious entities, but to authenticate data efficiently without being vulnerable to attacks. Identification of malicious entities is a problem, possibly harder, but it is not the reason why vehicular networks exist. Moreover, in these networks, "neighbors" of a vehicle change dynamically, thus, interaction times may not be arbitrarily long for a careful scrutiny of a sender. Hence, it makes sense to only ensure that the received data is not harmful while achieving efficiency in this process by learning from outcomes of verification of the past received data.

The following is a discussion of a pure belief-based algorithm based on the philosophy of adaptive data verification. The algorithm operates on one received message at a time from a buffer in which data awaits verification. For the following discussion, it is assumed that the receiver can maintain beliefs about individual vehicles. Note that this is not a reflection on its applicability. In this case, the belief is the probability that the transmitter is bona fide. Thus, a 0 means that the transmitter is malicious and 1 means that it is bona fide. The belief is basically a number between 0 and 1.

For the pure belief-based process, assume that N different modes of verification are available. Then the modes of verification are ranked in decreasing order of their strength and increasing cost of processing. The algorithm assigns intervals in [0, 1] to modes in the order of their rank such that the intervals cover [0,1] and are disjoint. Thus, the interval corresponding to a mode lies to the right of an interval corresponding to a mode stronger than it. Upon receiving the data for verification, the algorithm checks the belief level and employs the mode corresponding to the interval in which the current belief falls. The algorithm updates the belief based on the verification outcome and any external inputs, if any.

Figure 2:
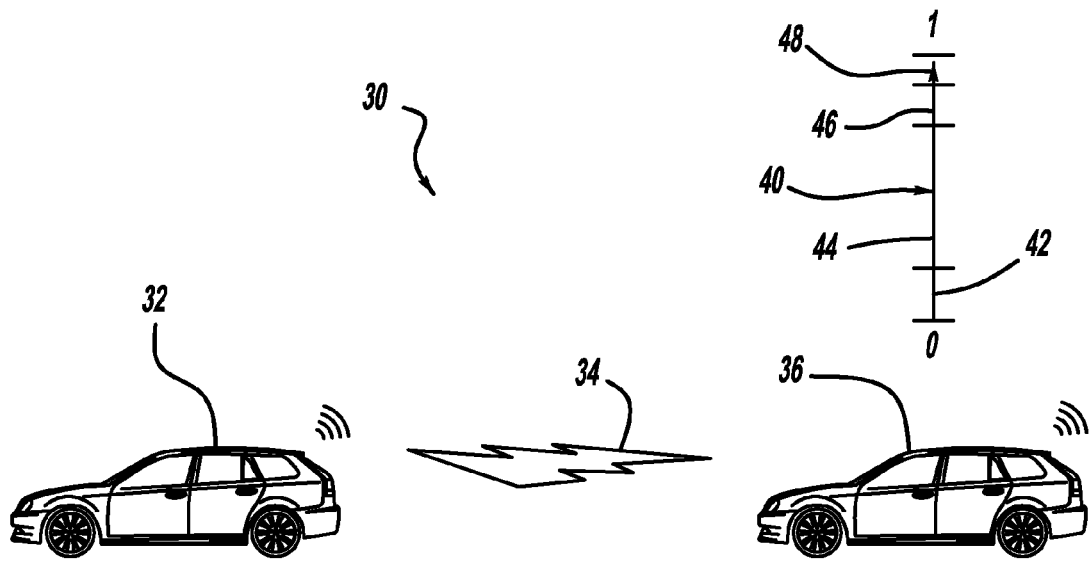
FIG. 2 is an illustration of a system that employs a pure belief-based algorithm for adaptive data verification.

FIG. 2 is an illustration of a system 30 employing a pure belief-based algorithm of this type. In the system 30, a transmitting vehicle 32 transmits a message 34 to a receiving vehicle 36 who will authenticate the message 34. The receiving vehicle 36 employs the pure belief-based algorithm which has set 0 as being malicious at the bottom end of scale 40 and a bona fide message as being 1 at the top end of the scale 40. The scale 40 is separated by intervals, where each interval is identified by a range of belief levels about the transmitting vehicle 32 and has a corresponding mode. In this example, for a belief level that falls within interval 42, the message is discarded, for a belief level that falls within interval 44, the message is verified with a PKI signature, for a belief level that falls within interval 46, the message is authenticated with a lightweight signature and for a belief level that falls within interval 48, the message is directly accepted. Thus in general, the mode corresponding to the interval is used to verify the message. As the modes increase towards malicious, its cost increases. Once a particular mode is employed to verify the message, the outcome of the verification is used to update the belief. If the outcome is positive, i.e., the message is deemed authentic, then the belief moves towards the sender being bona fide, and the verification mode moves toward light/weaker modes. If the outcome is negative, implying that the message may be malicious, the belief moves towards the sender being malicious and heavier modes of verification will come into effect for the next message from that sender.

The algorithm attempts to minimize the processing cost without being vulnerable to attacks. Here processing costs can have multiple connotations. For a verification mode, except blind accept and discard, cost typically reflects the processing time, though in some cases, such as sensor networks, it can also represent the cost of energy where the logic is that the more extensive the mode, the more it utilizes the computational machinery, and hence consumes more power. The cost may also correspond to an error in tracking a vehicle in vehicular networks. For blind accept, the cost may reflect the penalty to be paid for accepting a malicious message, whereas for discard mode, the penalty is rejecting a bona fide message.

As a simple example of this mechanism, consider that each vehicle can exercise three modes, namely, blind accept, discard and a PKI signature check. A possible strategy would be to accept data blindly if the belief is above 0.98, to discard it if it is below 0.3 and to verify the signature otherwise. The higher the perceived damage for malicious data, the higher will be the blind accept threshold. Similarly, the more conservative the receiver, the higher will be the discard threshold.

A belief and queue-length based algorithm for adaptive data verification, discussed below, bases the discussion about the modes of verification on both the belief level of the vehicle environment and the amount of unprocessed data in the verification buffer. For this algorithm it is assumed that the belief is maintained about the vehicular environment as a whole, where an extension to per-vehicle belief and buffer is straightforward. For ease of implementation, belief levels are discretized with a higher level indicating higher degree of maliciousness in the environment. As discussed above, the modes are characterized by their strengths.

For each belief level and queue-length value, the algorithm assigns modes in such a way that for a fixed belief level, weaker/lighter modes are employed with increasing queue-length, and beyond a certain queue-length, the mode remains the same. For a fixed queue-length, stronger modes are employed with decreasing belief level. This essentially creates a look-up table. To verify the data waiting in the buffer, the algorithm employs the mode from the table corresponding to the current belief level and the queue-length. The algorithm updates the belief based on the outcome of the verification, and external inputs, if any.

Figure 3:
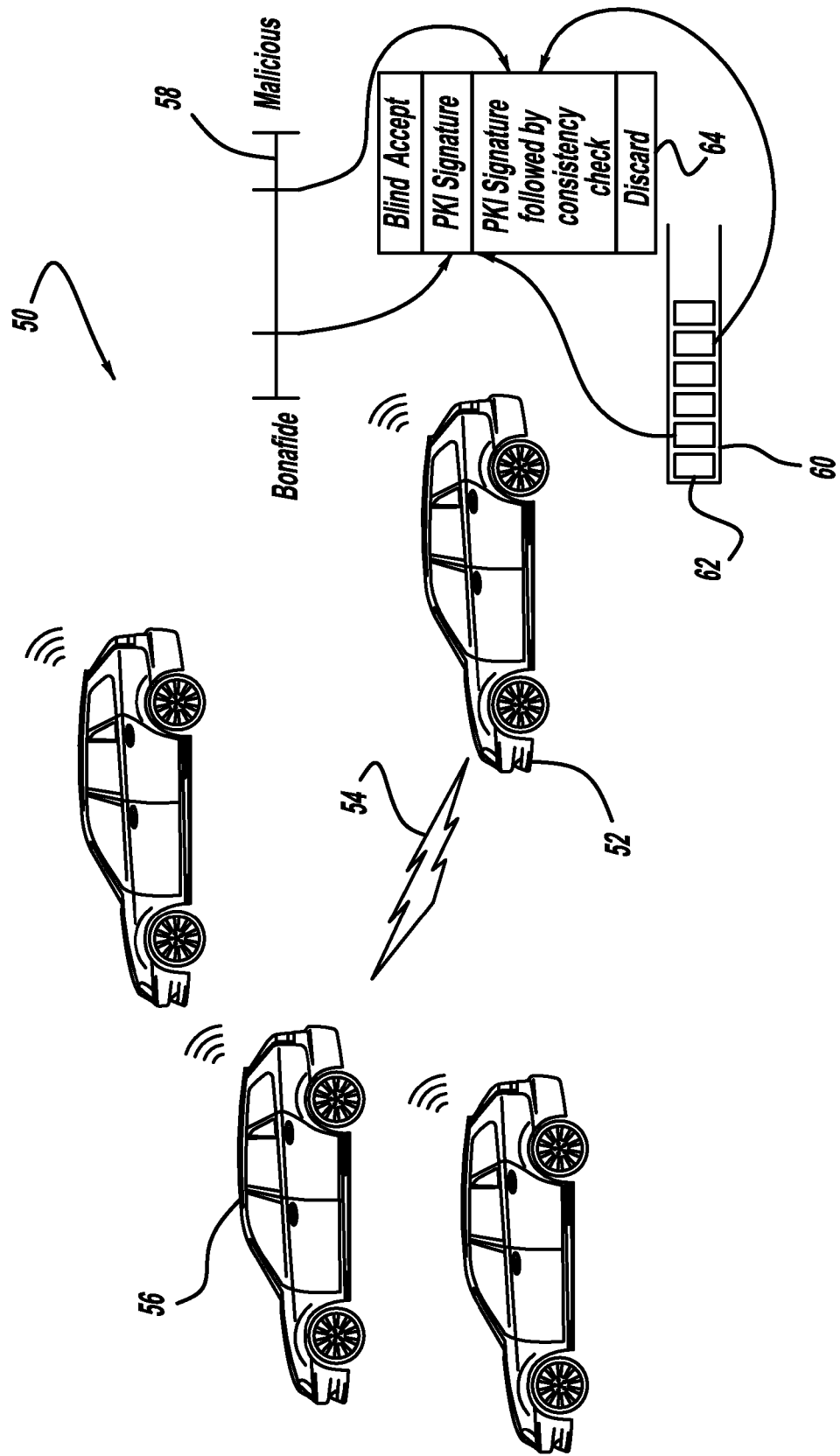
FIG. 3 is an illustration of a system that employs belief and queue-length-based algorithm for adaptive data verification.

FIG. 3 is an illustration of a system 50 showing the belief and queue-length based algorithm. A receiving vehicle 52 is in a vehicle receiving environment where it receives messages 54 from a plurality of other vehicles 56. The system 50 shows a belief level scale 58 where one end indicates that the belief level is a malicious message and the other end indicates that the belief level is a bona fide message. The system 50 also includes a buffer 60 storing unprocessed data 62 therein, where the unprocessed data 62 represent messages received by the receiving vehicle 52, but not yet verified or authenticated. The system 50 also includes a table 64 separated into modes, particularly, blind accept, PKI signature validation, PKI signature validation followed by consistency check and discard.

The level of verification and to what mode is employed to authenticate the message 54 is determined based on the combination of both the belief level of the vehicle environment on the scale 58 and how much unprocessed data 62 is in the buffer 60. As the belief level of the environment moves towards malicious, then the robustness of the authentication check increases, here shown as the PKI signature followed by consistency check mode. Likewise, as the belief level of the vehicle environment moves towards being bona fide, then weaker verification is required, a verification mode using a PKI signature. Likewise, if there is a lot of data in the buffer 60, then the verification mode will be weaker/lighter, shown here as a PKI signature mode, and if the amount of the data 62 in the buffer 60 is low, then the robustness of the authentication mode increases, shown here as the PKI signature followed by a consistency check mode in the table 64.

Recall that the aspect of queue-length comes in because data verifications will be a task running on the main processor, and the received data will have to be buffered until this task gets a time slice according to some processor schedule. The more extensive the verification mechanism, the lower is the number of messages verified within the time slice prescribed, hence the higher is the residual queue-length and the higher is the delay the received data experiences while waiting to be processed, and therefore, the higher is the possibility that the data will be ineffectual from the point of view of the application. The proposed mechanism tries to explicitly control the average latency in the waiting buffer 60 while reducing vulnerability. In order to achieve this, when the verification process gets a time slice, it decides the mode to employ, thereby, also determining the number of messages to which it will be applied. Thus, unlike the pure belief-based algorithm, this scheme applies the mode to multiple messages at a time.

By choosing discard as the mode of operation for large enough queue-lengths, the algorithm can yield protection from denial-of-service (DOS) attacks. This is because in the event that the receiver is bombarded with data at a high rate, the queue-length builds up and the algorithm simply discards the data instead of going into the verification overload.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for authenticating messages received at a receiver device, said method comprising:
   establishing a belief level for senders of messages that are received at the receiver device as to the messages validity;
   assigning the belief level to a scale where one end of the scale indicates a bona fide sender or message that will be accepted and the other end of the scale indicates a malicious sender or message that will be discarded;
   selecting an authentication mode based at least in part on the belief level, wherein one authentication mode includes a blind accept mode for a belief level at or around the bona fide end of the scale, a discard mode for a belief level at or around the malicious end of the scale and at least one mode therebetween; and
   performing an authentication process on the message depending on which mode is selected, wherein the at least one mode between the blind accept mode and the discard mode includes modes for validating a PKI signature, validating a lightweight signature and/or performing a consistency check based on local information, and wherein the PKI signature mode is selected if the belief level is near the malicious end of the scale and the lightweight signature mode is selected if the belief level is near the bona fide end of the scale.

2. The method according to claim 1 wherein if the blind accept mode or the discard mode are not available as modes of verification, other verification modes are employed and ranked according to their strength where a weakest mode may be selected at or around the bona fide end of the scale and a strongest mode may be selected at or around the malicious end of the scale.

3. The method according to claim 1 wherein one of the at least one modes is a consistency check mode that determines the authentication of the message based on local information around the receiver device.

4. The method according to claim 3 wherein sensors, GPS data or physics-based models are used to determine the local information.

5. The method according to claim 1 further comprising determining how much unprocessed data is present in a buffer at the receiver device to determine which of the at least one modes will be selected in combination with the belief level, wherein more unprocessed data in conjunction with a belief level near the malicious end of the scale moves the mode towards the discard mode and less unprocessed data in conjunction with a belief level near the bona fide end of the scale moves the mode towards the blind accept mode.

6. The method according to claim 1 wherein the receiver device is onboard a receiving vehicle and the message is transmitted from another vehicle.

7. The method according to claim 1 wherein the modes between the blind accept mode and the discard mode include a mode for performing only a cryptography check, a mode for performing only a consistency check and a mode for performing both a cryptography check and a consistency check.

8. The method according to claim 1 wherein the at least one mode between the discard mode and the blind accept mode is a plurality of different modes that are used to authenticate the message and have different cost and performance levels, where the cost and performance level increases as the mode moves along the scale towards the malicious end.

9. The method according to claim 8 wherein each mode corresponds to a range of belief levels along an interval of the scale.

10. A method for authenticating messages received at a receiver device, said method comprising:
- establishing a belief level for senders of messages that are received at the receiver device as to the messages validity;
- assigning the belief level to a scale where one end of the scale indicates a bona fide sender or message that will be accepted and the other end of the scale indicates a malicious sender or message that will be discarded;
- selecting an authentication mode based at least in part on the belief level, wherein one authentication mode includes a blind accept mode for a belief level at or around the bona fide end of the scale, a discard mode for a belief level at or around the malicious end of the scale and at least one mode therebetween; and
- performing an authentication process on the message depending on which mode is selected, wherein one of the at least one modes is a consistency check mode that determines the authentication of the message based on local information around the receiver device, and wherein sensors, GPS data or physics-based models are used to determine the local information.

\* \* \* \* \*